(No Model.)   2 Sheets—Sheet 1.
C. J. LUCE.
CAR BRAKE AND STARTER.

No. 438,694. Patented Oct. 21, 1890.

WITNESSES:  INVENTOR
Charles J. Luce
BY
ATTORNEYS.

(No Model.) 2 Sheets—Sheet 2.

C. J. LUCE.
CAR BRAKE AND STARTER.

No. 438,694. Patented Oct. 21, 1890.

WITNESSES: J. K. E. Diffenderffer, E. P. Bryan

INVENTOR Charles J. Luce
BY Price & Stewart
ATTORNEYS

UNITED STATES PATENT OFFICE.

CHARLES J. LUCE, OF NIANTIC, CONNECTICUT.

CAR BRAKE AND STARTER.

SPECIFICATION forming part of Letters Patent No. 438,694, dated October 21, 1890.

Application filed February 18, 1890. Serial No. 340,937. (No model.)

*To all whom it may concern:*

Be it known that I, CHARLES J. LUCE, a citizen of the United States, and a resident of Niantic, in the county of New London and State of Connecticut, have invented certain new and useful Improvements in Car Brakes and Starters, of which the following is a specification.

The accompanying drawings illustrate the invention, of which—

Figure 1:
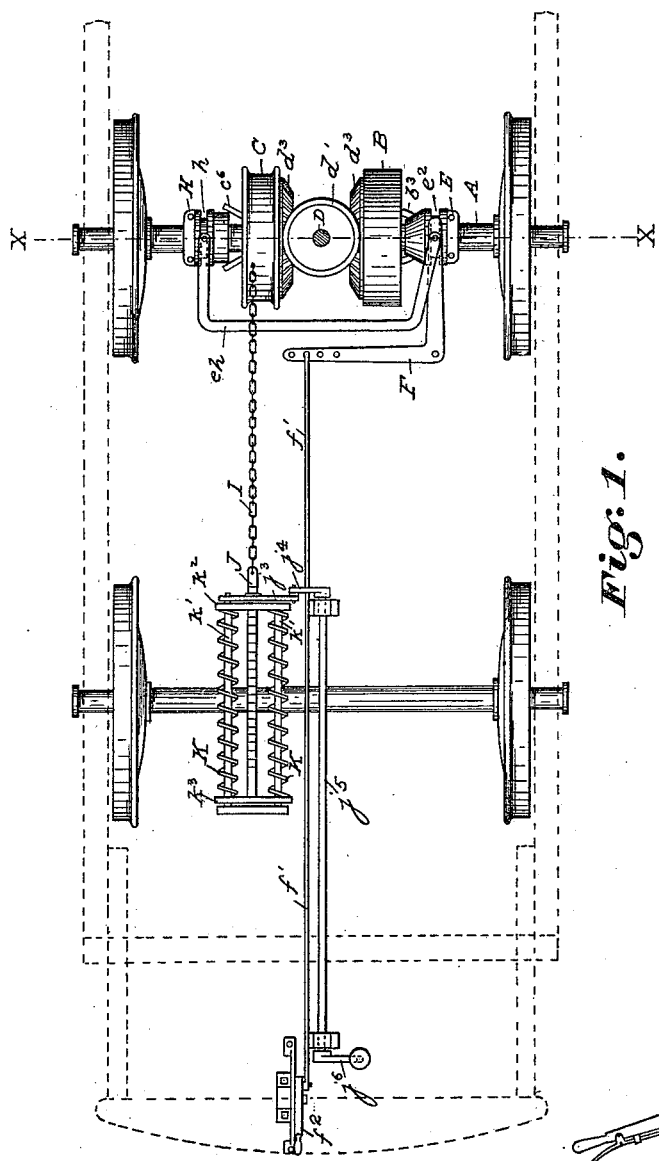
Figure 2:
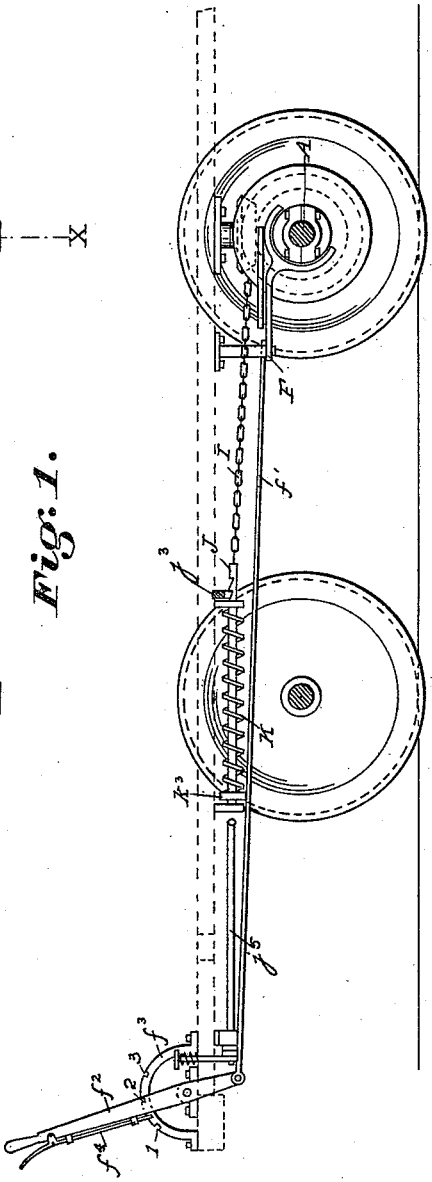
Figure 3:
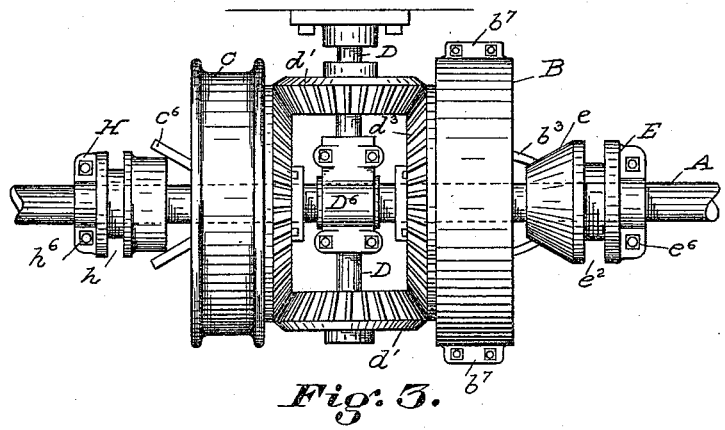
Figure 4:
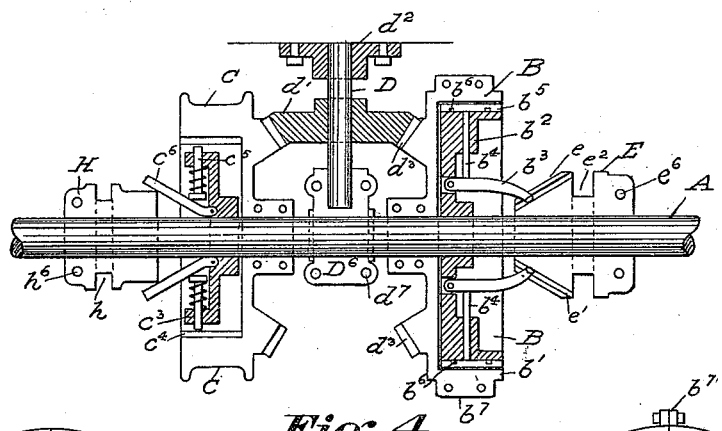
Figure 5:
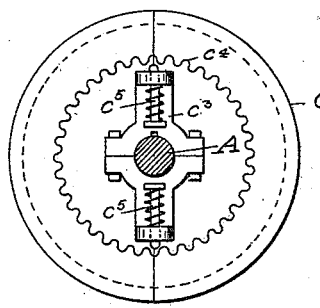
Figure 9:
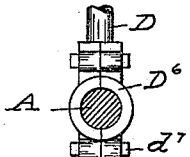
Figure 6:
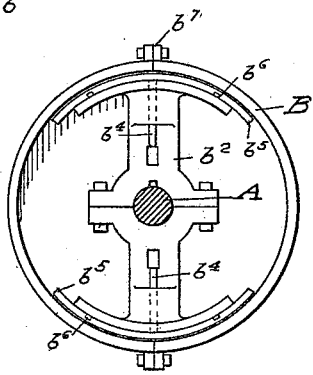
Figure 7:
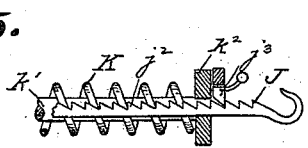
Figure 8:
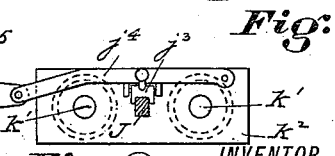

Figure 1 is a plan view of the device. Fig. 2 is a side view; Fig. 3, an elevation of the drum, pulley-gearing, and clutching devices, looking from the front or rear; Fig. 4, a vertical section of same on line $x\ x$ of Fig. 1. Fig. 5 is a view of the fastening mechanism for the drum; Fig. 6, a view of the fastening or securing mechanism for the wheel; Fig. 7, a view of the rod attached to drum-chain, showing ratchet and pawl; Fig. 8, an end view of the spring device; Fig. 9, a view of the beveled pulleys and shafts, showing a way in which the same may be cast in parts and bolted together around the axle.

Upon one of the axles A of a car or vehicle two wheels B and C are loosely mounted, so that the axle A may revolve without revolving these wheels until one or the other is fixed or secured to the shaft by the operator, when the one so fixed will revolve with the shaft. Each of these wheels is provided with suitable mechanism for making it rigid with the axle, within ready control of an operator or driver, and the apparatus is provided with suitable gearing or mechanism by means of which when one is fixed or secured so as to be revolved with the shaft the other is turned by the fixed one in an opposite direction. A form of gearing suitable for this purpose is shown in the drawings. A shaft D, (shown in the drawings,) which would work as well if placed horizontally, is provided with the bevel wheel or wheels $d'$.

In Fig. 3 I have shown two shafts D D and two bevel-wheels $d'\ d'$—one above and the other below the axle—and in Fig. 4 but one, standing above the axle. These bevel-wheels are loosely mounted upon the shaft D, so as to be readily turned by either of the pulleys, and in order to keep it properly balanced I have provided a socket $d^2$ for the upper end of the shaft. The inner faces of the two wheels B and C are provided with beveled wheels $d^3$, meshing with the wheel or wheels $d'$. The device may be operated with but one of the wheels; but in practice I prefer the two to equalize the friction and wear. It will be seen by this arrangement that the vehicle may be propelled and the axle A revolved without turning the wheels B and C until one or the other is fixed to be turned with the axle, when the one so fixed will revolve the other in the opposite direction. The arrangement of these two wheels upon the axle and the means for fastening or securing them constitute features of my invention.

The operation of the wheel B when fastened is to turn and hold the wheel C; but the operation of the wheel C when fastened, although the same as the other, has an additional function—that is to say, it acts as a drum to wind up a chain I, leading to the spring-bar, the operation of which will be hereinafter explained. This wheel will hereinafter be called the "drum."

*The fastening or securing devices.*—These devices are illustrated in Figs. 1, 2, 3, 4, 5, and 6, and differ somewhat in their construction, as shown in their connection with the wheels B and C, Figs. 5 and 6; but they may be transferred one for the other. The device shown for fastening the wheel B is illustrated in Figs. 4 and 6. The wheel is hollowed out on its side, leaving a wide circumferential rim or flange $b^2$, and rigidly secured to the shaft is the bracket $b^2$. In suitable positions upon this bracket are pivoted the levers $b^3$, and the bracket is perforated through to its circumference to provide a passage for the bolts $b^4$, the ends of which bear against the levers and are impelled outwardly by them. $b^5$ are shoes made to conform to the shape of the flange of the wheel and also to the curved ends of the bracket $b^2$, the latter being provided with pins $b^6$, which enter a corresponding slot in the shoe to hold the shoe in place as it revolves with the bracket. These slots are elongated a little to give a slight play to the pin. It will be seen by the foregoing description that when the bolts $b^4$ are thrown out by the levers the shoes $b^5$ are tightened against the inner rim of the wheel, securing it to the bracket to be turned by the revolution of the axle A. The levers $b^3$ are operated as follows: Mounted upon the axle A, so as to slide longitudinally thereon, (by means of a feather or otherwise,) is a clutch-ring E, having its inner end in the form of the frustum of a cone, as shown at $e$. This cone is slotted out longitudinally with a T-shaped groove $e'$, within which slides a pin upon the end of each of the levers $b^3$, so as to be always held within the grooves. Thus as the clutch-ring E slides inwardly the levers are thrown out. The bolts $b^4$ tighten the shoe to the flange of the wheel, which is thereby secured to revolve with the axle A. It will be seen by this arrangement that this method of tightening the wheel to the shaft is not absolutely positive, but is frictional, and will give slightly in case of necessity, allowing some movement to the axle to prevent breakage, and operates in a manner somewhat similar to the shoe of an ordinary brake on the outer circumference of a car-wheel, and while the driver may tighten either of the wheels to the axle in stopping a car it is preferred that he should operate on the wheel B, which is provided with this frictional clutching device. An annular slot $e^2$ surrounds the clutch-ring, (see Figs. 1, 3, and 4,) within which plays the forked end of the bell-crank lever F, which is operated by a rod $f'$, extending to the lever $f^2$ on the platform and within easy reach of the driver or operator. The lever $f^2$ is provided with means for holding it in the position desired. A device for this purpose is shown on Fig. 2. Arranged on the platform and by the side of the lever is shown a semicircular piece $f^3$, provided with the notches 1, 2, and 3, and arranged along the front edge of the lever is the sliding rod or bar $f^4$. When the lever is perpendicular, so that the end of the sliding bar will enter the notch 2, the wheel and drum are both loose upon the shaft. When the sliding bar is in either 1 or 3, the wheel or the drum is fixed to revolve with the axle.

*The drum and its attachments.*—The drum C is also hollowed out and retains the fastening device within the hollowed side, and the side of the axle next the drum is also provided with the sliding clutch-ring H, similar to the one on the other side for the wheel. It is provided with the annular groove $h$, within which is placed a fork on the end of connecting-loop $e h$, the other end of which is attached to the end of bell-crank lever F. Thus the clutch-rings E and H are caused to slide simultaneously one in and the other out as the lever $f^2$ is operated. The fastening device for the drum, however, is shown constructed somewhat differently from that of the wheel. Within the hollowed space in the side of the drum, and mounted rigidly on the axle A, is the bracket $c^3$. The inner periphery of the drum-flange is provided with cogs $c^4$, within which the ends of the spring-bolts $c^5$ enter. The levers $c^6$, which are pivoted to the bracket, are operated by the clutch-ring H to force the spring-bolts into the cogs and are drawn back by the spring when released.

When the drum is thus secured, or when the wheel B is secured to the shaft, while the vehicle is in motion it winds upon its periphery the chain I, attached to the end of the bar J, which tightens the springs K K. These spiral springs surround the tubes or rods $k'$ and have their forward ends resting against the cross-piece $k^3$, attached to the rod J, which presses against the other ends of the springs and is drawn out by the winding of the chain upon the drum. The rod J is ratcheted, as shown in Fig. 7 at $j^2$, and a pawl $j^3$ drops of its own weight into the ratchet as it is drawn out and stops the backward motion of the rod when the chain is wound upon the drum. The pawl is lifted by the lever $j^4$ on the bar or rod $j^5$, which extends forward to the platform and ends with a lever and rod $j^6$ attached thereto convenient to the foot of the driver.

Another feature of my apparatus is the arrangement and construction of its parts so that each and all of them may be removed from the axle A without taking out the axle. For example, viewing Fig. 5, a series of holes $l$ are shown intended to be bored or cast in the metal of the drum, so that by driving wedges therein the drum will be broken apart and will fit together at the break over the axle, where it may be properly secured; or it may be cast in two pieces, as shown, on the wheel B and provided with the lugs, as $b^7$, and secured together by bolts, as $b^8$. Again, the shaft D may be cast with its center piece $D^6$ in two pieces, as shown in Fig. 9, and secured by bolts, as at $d^7$. So, also, the clutch-wheels E and H may be constructed in two parts and bolted together, as shown at $e^6$ and $h^6$. Thus all the parts may be removed from the axle and repaired or renewed at pleasure without taking the axle from its journals.

The operation of the device is readily understood. Suppose the vehicle to be in motion and the driver wishes to stop. He pushes the lever $f^2$ until the sliding bar $f^4$ will enter one of the notches 1 or 3. This tightens either the wheel B or the drum C on the axle A, so that it revolves and winds the chain $l$ upon the drum, which is resisted by the tension of the springs K K, which serve as a brake to stop the momentum of the car. At the same time the pawl $j^3$ drops into the ratchet $j^2$, holding the bar J in position to make use of the stored-up power when required. When this power is to be used, the driver places his foot on the lever $j^6$, releasing the bar J, and the springs operate to turn the drum in the direction opposite to that in which it turned in winding the chain. It will be seen that the power will be stored up by tightening to the shaft either the wheel or the drum; but this stored power may, by the apparatus shown, be used to impel the car in either direction, forward or backward. For example, should the car be running forward and the drum be tightened to the axle, winding the chain upon it, and be kept in this position until the pawl $j^3$ is released from the bar J, the impetus given to the car would be backward; but if, on the contrary, the driver should first release the drum from the axle and tighten the wheel B and then release the pawl $j^3$ the unwinding of the drum would turn the wheel B and the axle in the opposite direction and the impetus of the car would be forward. Again, in stopping the car, if the driver should fix the wheel B to the shaft it would turn the drum to wind up the chain. He could then release the wheel and tighten the drum while the springs were held by the pawl, and when the latter is released the impetus of the car will be forward. Thus the arrangement of the wheel and the drum with their securing devices enables an operator to store up a force and utilize it at will upon the car or vehicle to give it an impetus either backward or forward.

What I claim, and desire to secure by Letters Patent, is—

1. In an apparatus for braking and starting a vehicle, the axle A, having loosely mounted thereon the wheel B and the drum C, means for tightening either to the axle to revolve therewith, and suitable gearing connecting the two, whereby the loose one is turned in an opposite direction by the one fixed to the axle.

2. In an apparatus for braking and starting a vehicle, the axle A, having loosely mounted thereon the wheel B and the drum C, means for tightening either to revolve with the axle, and suitable gearing connecting the two, whereby the loose one is turned in an opposite direction by the fixed one, in combination with a chain or cord wound upon the drum when it revolves and connected with a resistance-spring, substantially as described.

3. In an apparatus for braking and starting a vehicle, the axle A, having loosely mounted thereon the wheel B and the drum C, means for tightening either to revolve with the axle, and suitable gearing connecting the two, whereby the loose one is turned in an opposite direction by the fixed one, in combination with a chain or cord wound upon the drum when it revolves, a resistance-spring connected with the chain, and means for holding the spring and releasing it at will.

4. In an apparatus for braking and starting a vehicle, the axle A, having loosely mounted thereon the wheel B and the drum C and rigidly mounted thereon the brackets $b^2$ and $c^3$, provided with means for rigidly connecting the brackets with the wheel and drum, in combination with the sliding clutch-rings E and H, and the link $e\ h$, connecting the two, and the means by which they are operated to tighten one and loosen the other simultaneously.

5. In an apparatus for braking and starting a vehicle, the axle A, having loosely mounted thereon the wheel B and the drum C, each hollowed out at the side to leave an overlapping flange, and means located within the hollow side of each for tightening them to the axle, connected with operating devices controlled by the driver.

6. In an apparatus for braking and starting a vehicle, the axle A, having loosely mounted thereon the wheel B, provided with a frictional clutch or tightening device for securing the wheel to the shaft, in combination with a loosely-mounted winding-drum and means for revolving the drum, operated by the wheel B.

Signed at Niantic, in the county of New London and State of Connecticut, this 11th day of February, A. D. 1890.

CHARLES J. LUCE.

Witnesses:
JACOB E. BECKWITH,
JOHN W. LUCE.